United States Patent [19]
Tekathen et al.

[11] Patent Number: 5,435,434
[45] Date of Patent: Jul. 25, 1995

[54] DOUBLE HELICAL CHAIN WITH ARROW SURFACE FLANKS AND FULLY SUPPORTING JOINTS

[75] Inventors: Johann Tekathen, Dinslaken; Reinold Krohm, Herne, both of Germany

[73] Assignee: HT Maschenenvertrieb GmbH, Bottrop, Germany

[21] Appl. No.: 79,772

[22] Filed: Jun. 22, 1993

[51] Int. Cl.⁶ .............................................. B65G 19/24
[52] U.S. Cl. ..................................... 198/731; 198/733
[58] Field of Search ................ 198/731, 733; 59/4, 59/7, 84, 90, 93

[56] References Cited

U.S. PATENT DOCUMENTS

| | | | |
|---|---|---|---|
| 3,410,085 | 11/1968 | Sheth | 59/90 |
| 4,312,443 | 1/1982 | Niemoller et al. | 198/731 |

FOREIGN PATENT DOCUMENTS

| | | | |
|---|---|---|---|
| 2735792 | 6/1979 | Germany . | |
| 3322697 | 1/1985 | Germany | 198/731 |
| 3704176 | 5/1990 | Germany . | |
| 3905754 | 8/1990 | Germany . | |
| 3929148 | 1/1991 | Germany . | |

*Primary Examiner*—Joseph E. Valenza
*Attorney, Agent, or Firm*—James Creighton Wray

[57] ABSTRACT

For use especially in underground mining and tunnel construction, a steel link chain is provided that is composed of vertical and horizontal links and pushers. The vertical and horizontal links are formed by two parallel chain link arms and by chain link arches connecting them. The chain link arches are designed in a concave shape in the mutual roll-off area so that a surface contact is achieved. In addition, the chain link arches of the horizontal links have horizontally and vertically extending arrow surfaces that enable a safe surface contact in the area of the chain wheel that is constructed as a double helical wheel. The horizontal links furthermore are constructed in the area of the chain link arms like a groove, so that a form-fitting connection with the pusher is achieved, contributing to a significant improvement of operating characteristics and longer service lives. The especially favorable contact in the area of the chain wheel results in improved force application and thus the possibility to realize higher drive forces.

12 Claims, 2 Drawing Sheets

DOUBLE HELICAL CHAIN WITH ARROW SURFACE FLANKS AND FULLY SUPPORTING JOINTS

BACKGROUND OF THE INVENTION

DESCRIPTION

The invention relates to a steel link chain for chain conveyors used in underground mining or tunnel construction, with vertical and horizontal links to which are connected spaced-apart pushers and which are formed by two parallel chain link arms and chain link arches, whereby the chain link arches are shaped concavely in their mutual roll-off area in such a way that they form a surface contact area.

Such chain conveyors with interlocking chain links are used in underground mining and tunnel construction especially for transporting the mined coal and rock. Such chain conveyors are also frequently used for a wide variety of purposes underground. The chain conveyors are hereby pulled through conveyor troughs with a lateral sigma-profile in which the pushers of the chain conveyors are guided. They are subject to correspondingly high wear. In the development of such chain conveyors during the past years, only the dimensions have become increasingly larger in order to fulfill the increasing demands on performance. It is however not possible to prevent wear, but rather this wear becomes ever greater, since the contact points in the chain starwheel become smaller. Possible service lives are unsatisfactory, whereby chains with 42 mm wire diameter and more are being used.

In prior art chain conveyors, the force is applied via the chain wheels that are positioned at the ends of the conveyor trough and are equipped with drive motors. As mentioned above, the contact between chain wheel and round link chain in present standard chain conveyors only occurs in points in most cases, resulting in very high surface pressures in these contact area. Chain conveyors that have been used for longer periods therefore have distinct pitting and so-called duck rump wear in the roll-off area. This unfavorable and unsatisfactory force application represents the essential weakness of round link chains that are used almost exclusively today and limits their service life.

In order to increase the supporting cross-section, German Offenlegungsschrift 39 29 148.0 proposes that the shape of the wire forming the chain links is modified, i.e. the respective area is modified in such a way, that a larger supporting cross-section is attained.

German Auslegungsschrift 27 35 792.2-12 introduces a steel link chain with the usual round steel links and a chain starwheel in which the force is applied via the corresponding teeth.

German Patent 37 04 176.2-22 solves the problem of also combining chain wheels with stronger chain links while still utilizing existing conveyor troughs by providing the vertical links with a smaller pitch than the horizontal links. But this creates manufacturing problems, and in particular does not solve the problems of relatively high wear, especially in these stronger chain links.

Finally, German Offenlegungsschrift 39 05 754 introduces a solution in which a special design of the chain links is used to achieve a surface contact area, resulting in a significantly reduced wear. In addition, the horizontal chain links are given a special shape, so that a better force application is made possible in the chain wheel. This special shape is realized by a kind of center bridge that has an inverse tooth shape adapted to the tooth gaps. The disadvantage of this prior art steel link chain is that it is very heavy due to the center bridges, so that medium chain sizes actually are the suitable field of application. It hardly can be used with heavier chains. This prior art chain conveyor is also not optimally suited for single chain conveyors, whereby in particular the overall lengths are limited to approximately 200 to 240 m. But it was found that because of more favorable sizes of the fields, overall lengths of 300 and even 400 m are desirable. Also, additional distances are propagated where the galleries must be used a second time. In such cases, rolling curves are necessary, something for which single-chain conveyors are suited better.

SUMMARY OF THE INVENTION

The invention is thus based on the task of creating a steel link chain with load capacities that safely transfers high drive forces from the chain starwheel.

According to the invention, the task is solved in that the chain link arches of the horizontal links have horizontally and vertically double helical surfaces and that the chain link arms are constructed so as to be recessed from the ends of the chain link arches, forming a kind of groove.

A steel link chain constructed in such a manner first has fully supporting joints with surface loads instead of point loads, so that the occurring pressures and loads are much lower than in known chains. Also advantageous is the reversible force application at the chain link arches with the double helical surfaces, since this enables a double surface contact in vertical and horizontal direction in the gear wheel. This makes it possible to significantly improve force application. The vertically constructed double helical surfaces also make it possible to use the chain conveyor in both directions, so that much higher service lives can be achieved. The horizontal double helical surfaces result in a centering of the chain conveyor in the chain wheel and thus in an accurate drawing-in into the chain wheel, resulting not only in a quieter operation, but also in an improved positioning in the chain wheel and thus in improved force application. The groove engagement results in a support of the pusher along a broad base, resulting in a very stable positioning in the conveyor. When passing through a rolling curve, the rolling curve support forces do not act on the center of the chain, but rather act flectionally intensive on the entire horizontal link, so there is no longer an impairment due to wear, etc. There is no longer any slipping or slack position of the pusher, so that maintenance operations are also reduced. In connection with the rolling curve surface contact of the pusher wings, the flipper effect that occurred frequently in the past is eliminated.

According to a useful design of the invention it is provided that the double helical surfaces have flanks that form a kinematically rising arrow tip of 120° to 140°. This design corresponds to the design of the contact surfaces in the chain wheel, so that the desired optimum force application is achieved in the chain wheel.

No wear of the chain links from each other can occur, since the arrow tip is rounded in the front corresponding to the chain link arch of the vertical link. Particularly in the chain wheel, no unfavorable contacts are able to occur in this manner.

A uniform, favorable polygon effect is due to the effect that the vertical and horizontal links have the same pitch. This creates smaller loads. In particular, no changes must be made in the chain wheel.

A favorable contact of the pusher is also achieved by the fact that the double helical surfaces are constructed in the contact area of the pusher so as to extend parallel to the chain link arms and thus corresponding to the pusher recesses. This enables the described groove connection between pusher and horizontal chain link that results in the described significant advantages.

A significantly easier installation and at the same time safe connection between pusher and chain is brought about in that the pushers have a connection bow holding the respective horizontal link, said connection bow having bores that hold the attachment screws of a clamping bridge that is placed beneath the horizontal link from the bottom. The clamping bridge can be pushed under the chain at any desired place and be incorporated into the chain, so that the actual pusher then can be attached and fastened from the top in the manner of a hasp. This design of pusher and corresponding horizontal link of the chain achieves a torsion-proof and slack-proof design of the steel link chain, whereby the torsion resistance can be even more optimized by equipping the pushers on the bottom side with a recess that corresponds to the projection of the clamping bridge. This special design overall results in quiet operation, event in rolling curves, whereby especially at the links a clamping effect no longer occurs. Damage to or destruction of the links is thus excluded.

The described horizontal links of the steel link chain require a special manufacturing process, whereby the invention provides that the double helical surfaces are forged laterally to the chain link arches or that the horizontal links are hammered overall as forged pieces containing the double helical surfaces in the swage. Especially the last design variation has the advantage that very high forces are transferred, so that breaking loads may be 30% higher with the same dimensions than with standard chain links. In addition, the manufacturing itself is simplified, whereby it is ensured that the dimensions of the individual chain links are always the same.

Improved operating characteristics of the steel link chain in the conveyor are achieved according to the invention in that the chain link arms of the vertical links are constructed so as to have enlarged support surfaces. This is achieved in particular in that the vertical links have rectangular chain link arms in a barrel-shape, so that they contact the trough bottom with the larger surface.

In order to avoid chain locks of the complicated type known from prior art, the invention provides that pushers that are distributed at distances over the length of the chain are connected to each other by one or two chain parts that are attached in a releasable manner. These chain parts are connected with the respective pushers in such a manner via screws or similar attachment elements, that they can be released without difficulties if damages have occurred in order to replace or repair the affected chain sections.

It was already explained earlier that a quiet operation can be achieved in the curve due to the special shaping of the pushers. According to the invention, this is achieved in that the pushers have on the outside, contact surfaces that are curved in accordance with the usual rolling curves. This results in optimum contact of the respective pusher with the curve area.

The pushers possess a large pusher surface if they have, as provided in the invention, pushing parts constructed in arrow shape, whose pushing edge is constructed so as to extend parallel to the trough bottom. The pushing edge ensures a uniform contact with the trough bottom, whereby the quiet operation of the chain conveyor overall prevents that a knocking of the chain causes damages on the trough bottom, or reversely on the chain.

The invention is characterized especially in that the gradual and soft engagement of the horizontal links of the steel link chain with the chain wheels results in a noise-reduced operation. Because of the high engagement factor and better load carrying capacity, a surface contact and thus good force application is ensured in the area of the chain wheel at all times. Because of the better hugging to the base flanks during force application, duck rump wear and pitting cannot occur. Because of the special arrow surface design, the base flanks are shaped so that they themselves inhibit an upward slipping of the chain. The forced centering of the chain in the correspondingly designed chain wheel that is due to the double helical gearing has already been pointed out. There is no axial thrust with pinching effect during the roll-off process. Due to the symmetrical arrow shape of the top and base flanks, the double helical chain is reversible so that tension loop-chain drive booms can be used. A 50% better efficiency makes it possible for the double helical gear drive to save power. A better carrying profile with pressures that are on average 75% lower is possible at the contact and engagement surfaces. The special design of the pushers results in a form-fitting connection with the respective horizontal link of the steel link chain, and thus a broad-based support. The rolling curve support force does not have a central and flectionally intensive effect on the horizontal link. Slipping and a slack fit of the pusher is excluded. Together with the rolling curve surface contact of the pusher ends, there is no longer any flipper effect. It is not possible for tilting with increased pressures to occur; in addition, a loosening of the screws of the pusher connections is no longer possible. Overall, this steel link chain results in significantly improved operation and longer service lives, whereby instead of the former 220 now 300 t and more can be transferred. Overall lengths can be increased to 300 m and more, since the necessary drive forces can be applied to the chain without problems via the steel link chain of the invention. Also remarkable is the significantly simplified installation, since the clamping bridge can be pushed under the chain without problems, and the pusher then can be attached and fastened. Finally, we also would like to point out the reversibility of the entire chain conveyor, a factor that also contributes significantly to the distinct increase in service life. Consistent application of the double helical gear technology and the special connection of the horizontal link to the pushers thus results in a steel link chain that permits high drive forces and ensures long service lives.

Other details and advantages of the subject matter of the invention ensue from the following description of the pertinent drawing showing a preferred embodiment with the necessary details and individual parts. In the drawing:

DETAILED DESCRIPTION OF THE DRAWINGS

Figure 1:
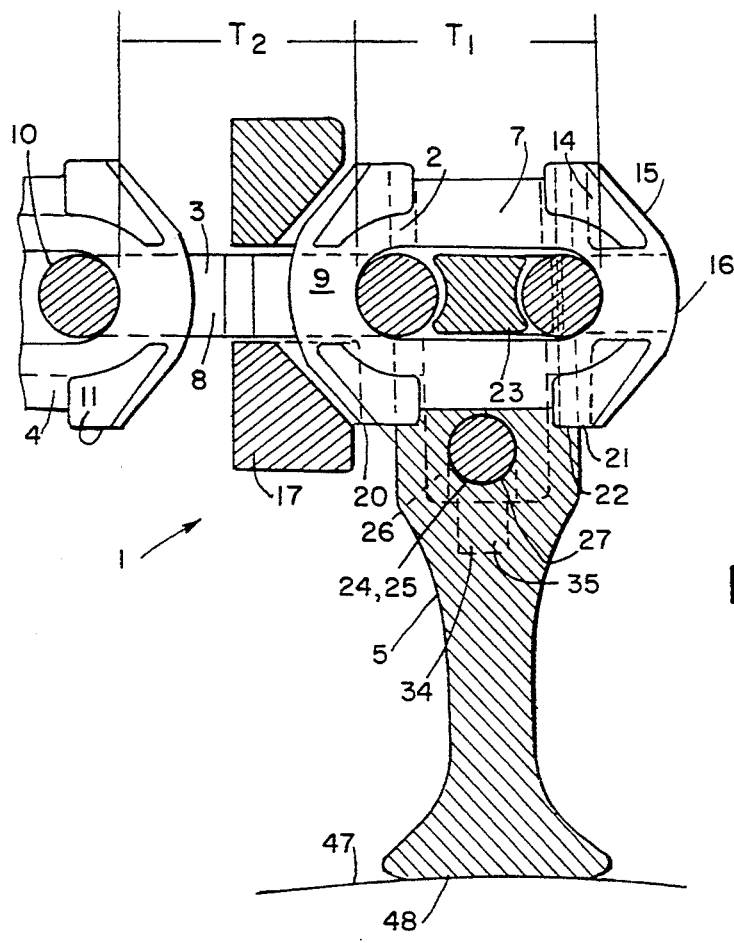
FIG. 1 shows a horizontal projection of a chain conveyor with several chain links and a pusher.

The steel link chain (1) seen in FIG. 1 consists of horizontal links (2,4) and vertical links (3). The vertical links (3) have the usual shape of chain links made from steel wire. The horizontal link (2) is connected to a pusher (5), whereby details will be explained below.

The horizontal links (2,4) and the vertical links (3) also have chain link arms (7 or 8) that extend parallel to each other and are connected to each other via chain link arches (9 or 10). Hereby the special design of the chain link arches (9) will be described in more detail below. In the roll-off area (11), the concave design that ensures a surface contact when the steel link chain (1) is extended is shown. In this way, wear in this area is specifically minimized.

The chain link arches (9) of the horizontal links (2,4) are equipped with horizontal double helical surfaces (14) and vertical double helical surfaces (15), so that an arrow tip (16) seen in FIG. 1 is created. Even FIG. 1 indicates that this results in a surface contact in the area of the chain wheel (17).

The horizontal links (2,4) are forged as a swage piece so that the horizontal and vertical double helical surfaces (14,15) can be realized accurately. This results in a double surface contact in the vertical and horizontal direction in the gear wheel, contributing both to a centering in the chain wheel (17) and thus to an accurate pulling-in into the chain wheel (17), and in a reversibility of the entire steel link chain (1).

The horizontal links (2,4) shown in FIG. 1 also have a special design in the area of the pushers (5) or chain link arms (7). The special shaping of the chain link arches (9) with their double helical surfaces (14,15) creates a kind of groove (19), so that a form-fitting connection between steel link chain (1) and pusher (5) can be realized. For this purpose, the ends (20) of the chain link arches (9) extend in the contact area (21) of the pusher (5) parallel to the chain link arms (7), so that the described form-fit is created by the design of the pusher recess (22).

Figure 2:
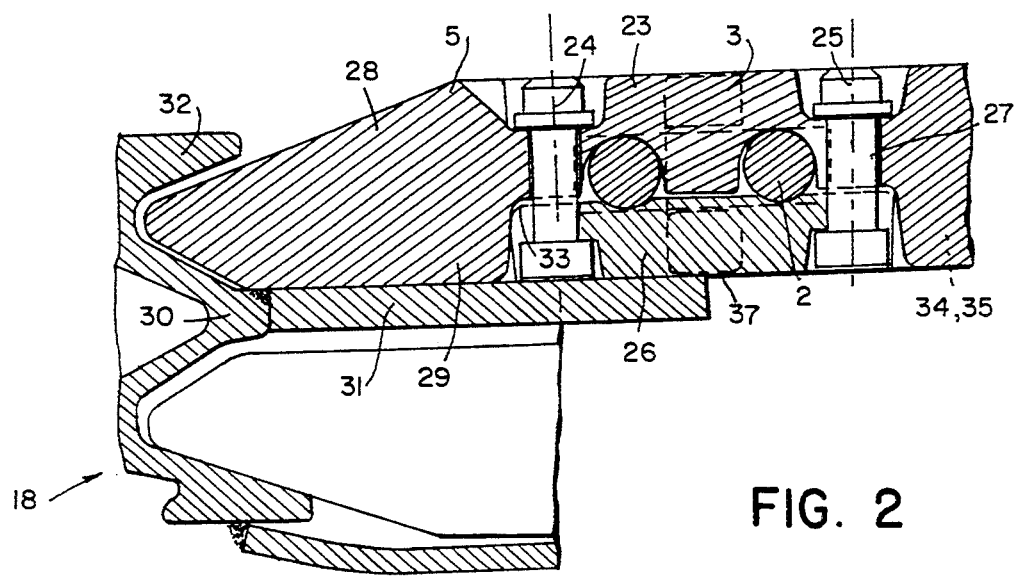
FIG. 2 shows a cross-section through the steel link chain with pusher.

FIG. 2 shows a section through a conveyor (18) in the area of a pusher (5). It is clearly shown here that the pusher (5) spans the steel link chain (1) or the horizontal link (2) via its connection bow (23), while a clamping bridge (26) has been placed underneath the bottom and, because of its design, can be pushed easily under the steel link chain (1), whereupon the attachment screws (24,25) are attached and the connection between steel link chain (1) and pusher (5) is made.

The clamping bridge (26) has attachment screws (24,25) or the attachment bore corresponding to the bore (27) in the connection bow (23). To optimize the torsion resistance, recesses (34) are provided on the bottom side (33) of the pusher (5), into which recesses (34) projections (35) of the clamping bridge (26) that are constructed correspondingly can be inserted. The attachment and fastening of the attachment screws (24,25) then results in a very stable connection between steel link chain (1) and pusher (5). The corresponding can be found in FIG. 1, where the recess (34) and the projection (35) are drawn striated.

The pushers (5) have a pushing part (28) that is guided at the end sides of the conveyor (18) in the guide sigma-profile. This pushing part (28) is constructed approximately in arrow-shape or plough share-shape to be able to transport large amounts of transport goods or push them ahead of itself. The pushing edge (29) hereby extends parallel to the trough bottom (31) of the groove (30).

The vertical links (3) are shaped in the area of the chain link arms (8) in such a way that an enlarged contract surface (37) is created, a fact shown clearly in FIG. 2. In contrast, the chain link arches (10), as shown in FIG. 1, usually made from round steel or round wire, so that the surface contact between horizontal links (2,4) and vertical links (3) described above is created.

Figure 3:
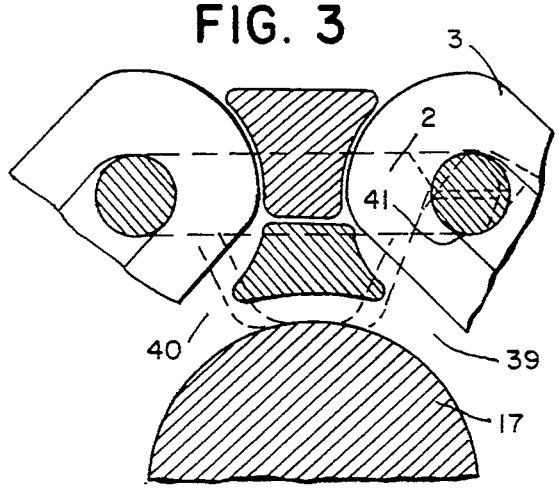
FIG. 3 shows a chain wheel in the form of a double helical wheel with four teeth and inserted steel link chain.
Figure 4:
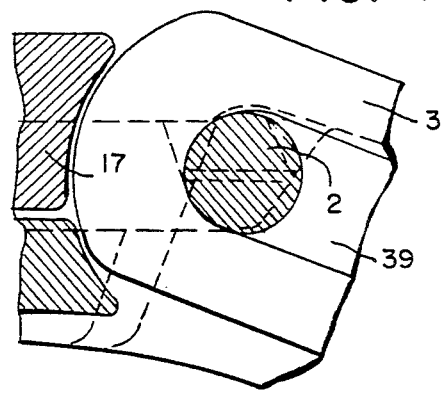
FIG. 4 shows a chain wheel constructed as a double helical wheel with eight teeth.
Figure 5:
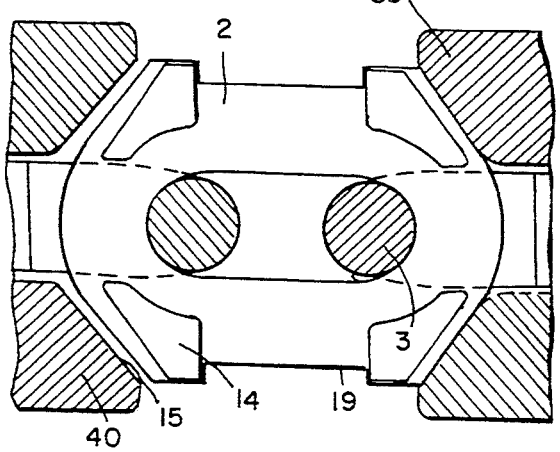
FIG. 5 shows a horizontal projection of a horizontal link running in the chain wheel.

FIG. 3 and 4 show two versions of a chain wheel (17), i.e. both constructed as a double helical wheel, whereby the one according to FIG. 3 has four teeth, the one according to FIG. 4 eight teeth. But it is also possible to realize double helical wheels with five, six, or seven teeth. The favorable contact of the horizontal links (2,4) with the corresponding teeth (39,40) and the corresponding guidance in the recesses (41) between the teeth (39,40) is shown clearly here. FIG. 5 supplements this with a portrayal of the special design of the double helical wheels and the resulting favorable contact between horizontal links (2) and teeth (39,40).

Figure 6:
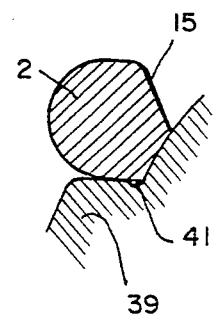
FIG. 6 shows a section, rotated, in order to clarify the contact area between chain link and double helical wheel.

FIG. 6 shows an enlargement of the support area between chain link (2) and tooth (39), whereby (41) here designates a recess that is intended to prevent a pinching during the rolling off of the horizontal link. The double helical form of the chain wheel (17) is again illustrated here.

Figure 7:
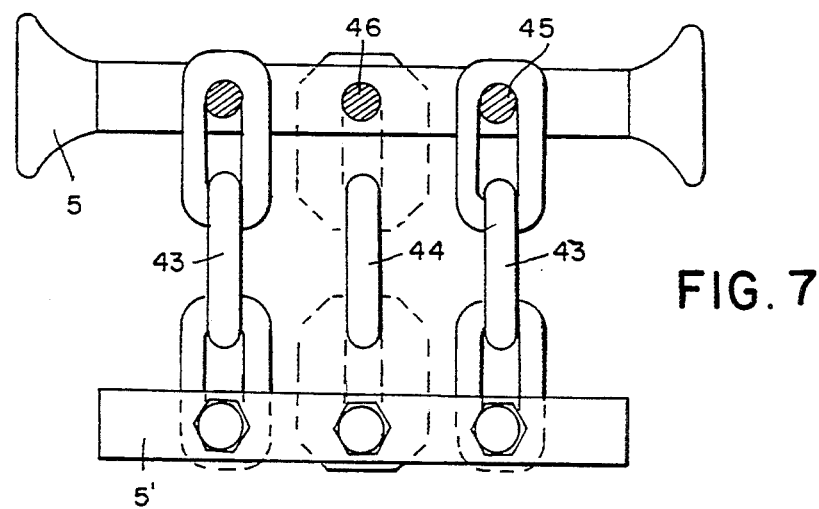
FIG. 7 shows a horizontal view of a steel link chain in the area of a releasable connection.

FIG. 7 shows the replacement of standard chain locks, for which purpose the pushers (5,5') are connected via chain part elements (43) or via a central chain part element (44). These chain part elements (43,44) are attached to the pushers (5,5') via screw connections (45 or 46), so that the chain strand-can be released if needed.

And finally, reference is again made to FIG. 1, where a rolling curve (47) is suggested at the bottom edge. The pusher (5) is equipped in the contact area with a contact surface (48) that is adapted to the shape of the rolling curve (47), so that a very quiet operation of the chain conveyor of the steel link chain is achieved by such a rolling curve. The horizontal links (2,4) and vertical links (3) have the same pitch T1 or T2, so that the shaping of the horizontal links (2,4) also contributes to the fact that the steel link chain (1) can be reversed without problems and can be used in the opposite direction.

All mentioned characteristics, including those found only in the drawings, are considered essential to the invention both alone and in combination.

What is claimed is:

1. Steel link chain for conveyors used in underground mining or tunnel construction, with vertical and horizontal links to which are connected spaced-apart pushers and which are formed by two parallel chain link arms and chain link arches connecting the latter, whereby the chain link arches are shaped concavely in their mutual roll-off area in such a way that they form a surface contact area, characterized in that the chain link arches (9) of the horizontal links (2,4) have arrow shaped ends with surfaces (14,15) and that the chain link arms (7) are constructed so as to be recessed from the ends (20) of the chain link arches, forming a kind of groove (19).

2. Steel link chain according to claim 1, characterized in that the arrow shaped ends with surfaces (14,15) have flanks that form an arrow tip (16) of 120° to 140°.

3. Steel link chain according to claim 2, characterized in that the arrow tip (16) is rounded in the front corresponding to the chain link arch (10) of the vertical link (3).

4. Steel link chain according to claim 1, characterized in that the vertical links (3) and horizontal links (2) have the same pitch (T1, T2).

5. Steel link chain according to claim 1, characterized in that plural pushers are provided for connecting with the horizontal links, the arrow shaped ends with surfaces (14,15) are constructed in the contact area (21) of the pusher (5) so as to extend parallel to the chain link arms (7,8) and thus corresponding to plural recesses in the pushers.

6. Steel link chain according to claim 5, characterized in that the pushers (5) have a connection bow (23) holding the respective horizontal link (2), said connection bow (23) having bores (27) that hold the attachment screws (24,25) of a clamping bridge (26) that is placed beneath the horizontal link from the bottom.

7. Steel link chain according to claim 6, characterized in that the pushers (5) have on the bottom side (33) a recess (34) that corresponds to the projection (35) of the clamping bridge (26).

8. Steel link chain according to claim 1, characterized in that the arrow shaped ends with surfaces (14,15) are forged laterally to the chain link arches (9), or that the horizontal links (2) are hammered overall as forged pieces in a swage.

9. Steel link chain according to claim 1, characterized in that the chain link arms (8) of the vertical links (3) are constructed so as to have enlarged support surfaces (37).

10. Steel link chain according to claim 5, characterized in that pushers that are distributed at distances over the length of the chain (1) are connected to each other by one or two chain part elements (43,44) that are attached in a releasable manner.

11. Steel link chain according to claim 5, characterized in that the pushers (5) have on the outside, contact surfaces (48) that are curved in accordance with the usual rolling curves (47).

12. Steel link chain according to claim 5, characterized in that the pushers (5) have pushing parts (28) constructed in an arrow shape, whose pushing edge (29) is constructed so as to extend parallel to the trough bottom (31).

* * * * *